_United States Patent Office_

3,347,824
Patented Oct. 17, 1967

3,347,824
REACTION BETWEEN AROMATIC DIACYL COMPOUNDS AND AROMATIC SILANES AND THE POLYMERS PRODUCED THEREFROM
Robert M. Washburn and Kendrick R. Eilar, Whittier, Calif., assignors to American Potash and Chemical Corporation, Los Angeles, Calif., a corporation of Delaware
No Drawing. Filed Sept. 3, 1963, Ser. No. 306,351
6 Claims. (Cl. 260—46.5)

This invention relates, in general, to novel carboxy-silanol polymers and to novel methods for the preparation of these polymers. More spceifically, this invention relates to carboxy-silanol polymers prepared by the reaction of aromatic diacyl compounds with aromatic silane compounds.

Many classes of polymers are well-known but in general, considerable difficulty has been experienced in using these polymers, because they are not sufficiently hydrolytically, thermally and oxidatively stable for use under extreme conditions of heat and humidity.

The present invention provides versatile carboxy-silanol polymers which are hydrolytically, thermally and oxidatively stable even under extreme conditions. The polymeric products of this invention can be prepared as either thermosetting or thermoplastic materials, depending upon whether di-functional or tri-functional reactants are employed. The thermoplastic polymers of the present invention can be hot-pressed into transparent films and drawn into fibers. The thermosetting polymers of the present invention can be molded to yield useful parts which can be machined and polished. Also, the thermosetting polymers are useful as potting compositions for electrical devices, and as fillers for other commercial polymers, such as, for example, polyester and epoxy resins.

Carboxy-silanol polymers are prepared according to the present invention by reacting an aromatic diacyl compound having either the formula $$M-\overset{O}{\underset{\|}{C}}-R-\overset{O}{\underset{\|}{C}}-M \text{ or the formula } \overset{O}{\underset{\|}{C}}-R-\overset{O}{\underset{\|}{C}}$$
$$\diagdown O \diagup$$

with an aromatic silane having the formula

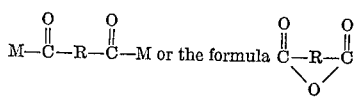

In the above formulas, the integer $n$ is indicative of the number of Z substituents in the aromatic silane reactant, and is either 2 or 3. The R substituent in the aromatic diacyl reactant is an aryl substituent. The M substituents in the aromatic diacyl reactant can be any of the hydroxy, alkal metaloxy, halo or hydrocarbyloxy substituents. The Z substituents in the aromatic silane reactant can be the same as the M substituents except that instead of a hydrocarbyloxy substituent, as in the aromatic diacyl reactant, the aromatic silane can contain a hydrocarbyloxy substituent. The term hydrocarboyloxy substituent refers to a substituent having the formula RCOO— wherein R is a hydrocarbon group. The M and Z substituents are so selected that the resulting by-product is one of a carboxylic acid ester, a carboxylic acid anhydride, a carboxylic acid salt, a carboxylic acid chloride, a carboxylic acid, an inorganic salt, a hydrohalogen acid or water. The $R_1$ substituent in the aromatic silane reactant is an aryl substituent.

The aromatic diacyl reactants and the aromatic silane reactants used in the process of this invention are, in general, commercially available.

The carboxy-silanol polymers produced in accordance with this invention can be isolated from the reaction mixture or not, as desired. Isolation of the polymers can be accomplished by conventional techniques including, for example, heating the reaction mixture to drive off any volatile substituents, solvent extraction, and the like.

Super- or sub-atmospheric pressures can be used in this reaction as desired, but they are not necessary. Preferably, the reaction is conducted in an anhydrous environment, because many of the silane reactants hydrolize readily.

The preparation of carboxy-silanol polymers can be accomplished with or without a solvent. If no solvent is used, the reactants are mixed and heated until polymerization is complete. Alternatively, non-reactive solvents can be used. Any inert solvent can be used. Examples of suitable inert solvents include benzene, toluene, xylene, ethylbenzene, chlorobenzene, bromobenzene, methylcyclohexene, dimethylcyclohexane, dibutyl ether, bromobutane, cyclohexane, and the like.

The nature of the carboxy-silanol polymer produced by any given reaction is controlled to a large extent by the type and proportions of the reactants employed. These principles are illustrated by reference to the following general equation:

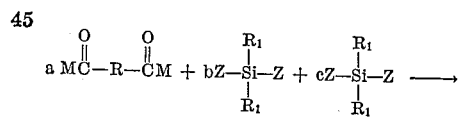

carboxy-silanol polymer + by product derived from MZ

If the coefficients in the above equation are: $a=5$, $b=2$, $c=2$, the result will be a thermoset cross-linked polymer. If, on the other hand, the coefficients are: $a=1$, $b=1$ and $c=0$, the result will be a thermoplastic, linear polymer. A cross-linked polymer is also produced where the coefficients in the above equations are $a=3$, $b=0$, and $c=2$.

The proportions of the reactants can be varied through an almost infinite number of possibilities to produce a wide variety of polymers, ranging from thermoplastic linear polymers to hard, infusible, highly cross-linked polymers. When a mixture of both di-functional and tri-functional reactants are used, the arrangement of the groups in the polymer is a random one, to which no specific structure can be assigned.

While it is believed that the structure of the carboxy-silanol polymers of this invention contains the following linkage:

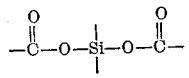

the arrangement of the units within the polymers is not positively known. Likewise, the precise nature of the end groups on these polymers is not known with any degree of certainty.

The reaction proceeds satisfactorily within a wide range of temperatures. For many combinations of reactants, the reaction can be carried out as low as room temperature (20–30° C.). Preferably, the reaction is carried out at temperatures of from about 50–150° C. In some cases, temperatures as high as 250 or even 300° C. can be used, depending upon the particular starting reactants employed. When a solvent is used, the reaction temperature is limited by the boiling point of the solvent at any given pressure; in some cases, the temperature is limited by the formation of an azeotrope with reaction by-products and the solvent.

In the specification, claims and following examples, all parts and percentages are by weight unless otherwise specified. The following examples are submitted to illustrate even more clearly the invention and are not to be construed as limiting the invention.

*Example I*

This example illustrates the reaction of terephthalic acid and diacetoxydiphenylsilane without solvent and is illustrative of the preparation of linear carboxy-silanol polymers.

One mole of terephthalic acid and one mole of diacetoxydiphenylsilane react to yield a linear thermoplastic polymer and two moles of acetic acid. The polymerization reaction is carried out in the absence of solvent. The reactants are mixed and heated to a final temperature at about 250° C. During the heating period, acetic acid distills from the mixture. The resulting resin can be broken up and ground to provide a molding powder.

*Example II*

This example is illustrative of the reaction of terephthalic acid and diacetoxydiphenylsilane in a solvent to prepare a linear thermoplastic polymer.

Terephthalic acid, 7.97 g. (0.048 mole) and 14.4 g. (0.048 mole) diphenyldiacetoxysilane are heated under reflux in 50 ml. of p-xylene for 1 hour. At the end of this time, an azeotrope of acetic acid and p-xylene is distilled at 122–127° C. Three 15 ml. fractions of the distillate are collected before the residual solvent and reactants are removed from the residue at reduced pressures. On cooling, a cream-colored brittle glass is obtained from the residue which does not melt up to 255° C., only appearing to soften at about 185–190° C. This material, which is only slightly affected by boiling water, can be hot-pressed into a translucent film. The opaque glass thus prepared gives a clear melt in a Bunsen flame without apparent decomposition.

Other suitable difunctional aromatic silanes which can be substituted for the diphenyldiacetoxysilane include diacetoxydiphenylsilane, diacetoxy-di-p-tolylsilane, diacetoxy-di-o-tolylsilane, diacetoxydi-m-chlorophenylsilane, diacetoxydi-p-bromophenylsilane, dipropionoxy-bis-(m-diethylaminophenyl)silane, di-p-methoxyphenyldichlorosilane, di-p-cyclohexylphenyldibromosilane, diphenyl-difluorosilane, di-p-xylyldicyclopentanoyloxysilane, di-m-chlorophenyldihydroxysilane, dipentachlorophenyldihydroxysilane, dipentafluorophenyldihydroxysilane, di-p-phenoxyphenyldichlorosilane, and the like.

*Example III*

In this example, tetrachloroterephthaloyl chloride is reacted with diacetoxydiphenylsilane in the absence of solvent to produce an amorphous polymer.

Under an argon atmosphere, 8.0 g. (0.027 mole) of diphenyldiacetoxysilane and 9.2 g. (0.027 mole) of tetrachloroterephthaloyl chloride are slowly warmed to distill out 2.5 ml. of acetyl chloride during 4.5 hours. The reaction mixture is then aspirated while warm. The cooled material is a shiny black glass which is soluble in chloroform and in carbon tetrachloride. Boiling water has little effect on the polymer and it burns only when heated strongly in a Bunsen flame.

The tetrachloroterephthaloyl chloride used in this reaction can be replaced by any of the following reactants to produce a satisfactory result: phthalic acid, phthalic anhydride, phthaloyl chloride, diphenic acid, diphenic anhydride, isophthalic acid, and the corresponding alkali metal salts, halides and esters of these aromatic diacyl reactants.

*Example IV*

Terephthaloyl chloride is reacted with diacetoxydiphenylsilane in a solvent to produce an amorphous polymer.

To a slurry of 174.8 g. (0.86 mole) of terephthaloyl chloride in 400 ml. of dry p-xylene in a 1 liter resin flask is added a 50 g. portion of 259 g. (0.86 mole) of diphenyldiacetoxysilane. The resulting solution is stirred at room temperature for 30 minutes before the remainder of the silane and an additional 100 ml. of p-xylene are added. Acetyl chloride and p-xylene are removed by distillation up to a head temperature of 70° C. and then the pressure is reduced to about 20 mm. The pressure is then reduced to 2 mm. and heat applied for 4 hours at such a rate that the polymer remains fluid. On cooling, a dark-brown glass forms which is readily broken out of the flask and pulverized in a mortar. A residual odor of acetyl chloride is removed by maintaining the powdered polymer under a reduced pressure of 0.3 mm. for 18 hours. The yield of a brittle, brown-colored glass is 288 g. This material can be used as a molding powder.

*Examples V–XIII*

The general reaction conditions described above can be used to prepare a variety of linear and cross-linked polymers as set forth in the following table.

| Example No. | Moles of Aromatic Diacyl Compound | Moles of Aromatic Silane - Difunctional | Moles of Aromatic Silane - Trifunctional | Remarks | MY By-Product |
|---|---|---|---|---|---|
| V | 1 CH$_3$O-CO-C$_6$H$_3$(C$_3$H$_7$)-CO-OCH$_3$ | 1 (CH$_3$CO-O)$_2$Si(C$_6$H$_5$)$_2$ | | Linear thermoplastic polymer. | CH$_3$COCH$_3$ |
| VI | 5 NaO-CO-C$_6$H$_3$(Cl)-CO-ONa | 2 Cl$_2$Si(C$_6$H$_5$)$_2$ | 2 Cl$_3$SiC$_6$H$_5$ | Cross-linked thermoset polymer. | NaCl |
| VII | 1 Cl-CO-C$_6$H$_3$(OC$_6$H$_5$)-CO-Cl | 1 (HO)$_2$Si(C$_6$H$_5$)$_2$ | | Linear thermoplastic polymer. | HCl |
| VIII | 1 Cl-CO-C$_6$H$_4$-O-C$_6$H$_4$-CO-Cl | 1 (HO)$_2$Si[C$_6$H$_4$-CH$_3$]$_2$ | | Linear thermoplastic polymer. | HCl |
| IX | 7 Cl-CO-C$_6$H$_4$-O-C$_6$H$_4$-CO-Cl | 4 (C$_5$H$_{11}$CO-O)$_2$Si[C$_6$H$_4$-Br]$_2$ | 2 (C$_6$H$_5$CO-O)$_3$Si-C$_6$H$_4$-Br | Cross-linked polymer. | C$_5$H$_{11}$COCl and C$_6$H$_5$COCl |
| X | 1 CH$_3$C(O)-O-C(O)-C$_6$H$_4$-S-C$_6$H$_4$-C(O)-O-C(O)CH$_3$ | 1 (CH$_3$CO-O)$_2$Si[naphthyl]$_2$ | 1 Cl$_3$Si-OC$_6$H$_5$ | Completely cross-linked thermoset polymer. | CH$_3$COCl |
| XI | 1 (phthalic anhydride) | 1 (CH$_3$CO-O)$_2$Si[naphthyl]$_2$ | | Linear thermoplastic polymer. | (CH$_3$CO)$_2$O |

| Example No. | Moles of Aromatic Diacyl Compound | Moles of Aromatic Silane | | | Remarks | MY By-Product |
|---|---|---|---|---|---|---|
| | | Difunctional | Trifunctional | | | |
| | | | | | | |
| XII | 1 HOOC—C₆H₄—COOH (with Cl substituent) | 1 (HO)₂Si(C₆H₅)₂ | | | Linear thermoplastic polymer. | H₂O |
| XIII | 1 NaOOC—C₆H₄—C₆H₄—COONa | 1 (C₂H₅CO)₂Si(C₆H₅)₂ | | | Linear thermoplastic polymer. | C₂H₅COONa |

Example XIV

This example is illustrative of the preparation of a linear polymer from a mixture of dicarboxylic acid chlorides and a mixture of difunctional silanes.

A mixture of one mole each of terephthaloyl chloride, isophthaloyl chloride, diacetoxydiphenylsilane and diacetoxy-di-p-phenoxyphenylsilane is heated in xylene to liberate four moles of acetyl chloride. After all of the acetyl chloride is removed, the xylene is removed by distillation, leaving a linear polymer. The resulting polymer can be ground to provide a molding powder.

Alternatively, the xylene solution of the resulting polymer can be used to prepare fiber-reinforced laminates.

Example XV

This example is illustrative of the preparation of a cross-linked polymer from a mixture of mixed dicarboxylic acids, mixed difunctional silanes and mixed trifunctional silanes.

A mixture of two moles of oxy-bis-(p-benzoic acid), three moles of terephthalic acid, two moles of diacetoxy-di-p-bromophenylsilane, and two moles of triacetoxy-p-xylylsilane are heated in mesitylene to liberate ten moles of acetic acid. The resulting polymer is recovered by evaporating the mesitylene. Alternatively, the mesitylene solution can be used directly for preparing glass-cloth laminates.

Other suitable trifunctional silanes which can be substituted for the triacetoxy-p-xylylsilane in this reaction, to produce a satisfactory polymer include phenyltriacetoxysilane, phenyltribenzoxysilane, p-phenoxyphenyltrichlorosilane, p-xylyltrihexanoyloxysilane, p-phenyl-phenyltrihydroxysilane, pentachlorophenyltricyclohexanoyloxysilane, p-cyanophenyltriacetoxysilane, and the like.

The aromatic diacyl reactants which can be represented by the formulas

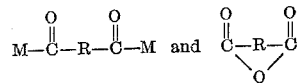

contain the divalent arylene substituent R, and the monovalent reactive substituent M. Illustrative examples of divalent arylene substituents include chlorophenylene, fluorophenylene, tolylene, bromophenylene, tetrachlorophenylene, phenyl-phenylene, phenoxyphenylene, ethoxyphenylene, hexoxyphenylene, nitrophenylene, phenylthiophenylene, diphenylene ether, diphenylene thioether, biphenylene, butylphenylene, hexylphenylene, naphthylene, xylylene and the like.

Illustrative examples of the reactive M and Z substituents include hydroxy, the alkali metaloxy substituents —ONa, —OK, and —OLi; the halogen substituents —F, —Cl, and —Br; the hydrocarboyloxy substituents formoxy, acetoxy, butyryloxy, and heptanoyloxy; the hydrocarbyloxy substituents methoxy, propoxy, pentyloxy and the like.

The aromatic silane reactants which may be represented by the formula

contain the reactive substituents Z and the aryl substituents $R_1$. Illustrative examples of monovalent aryl substituents include phenyl, biphenylyl, naphthyl, tolyl, xylyl, ethylphenyl, hexylphenyl, butylphenyl, and the like.

The resiliency of the carboxy-silanol polymers of this invention can be increased by controlling the symmetry of the polymer crystal sites. In general, the greater the dissymmetry of the crystal sites, the greater will be the resiliency of the polymer. Thus, in Examples XIV and XV, the resiliency of the polymer is advantageously increased by using mixtures of the reactants.

The solubility of carboxy-silanol polymers in organic solvents, which is important, for example, in making glass cloth laminates, can generally be increased by appending alkyl groups to the aromatic substituents in the polymers.

The polymer derived from the reaction of terephthalic acid and diacetoxydiphenylsilane advantageously provides an excellent molding resin for the preparation of shapes by hot pressing. This polymer lends itself particularly well to formation by hot pressing since it does not form strong bonds to metal and can therefore be removed from the die easily. If it is desired to produce a polymer which forms a strong bond to metals, it is generally possible to produce strong metal bonding properties by appending polar functional groups to the aromatic substituents of the polymers. For example, polymers containing polar functional substituents such as $-CN$, $-NO_2$, $-Br$, phenoxy, methoxy, and the like, increase the metal bonding properties of the polymer.

As will be understood by those skilled in the art, what has been described is the preferred embodiment of the invention. However, many modifications, changes, and substitutions can be made therein without departing from the scope and spirit of the following claims.

What is claimed is:

1. Process for producing a carboxy-silanol polymer comprising
   admixing and reacting at a temperature within the range of from about 20° C. to 300° C. an aromatic diacyl compound selected from the group consisting of at least one of

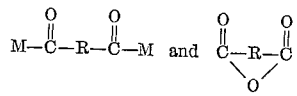

with an aromatic silane having the formula

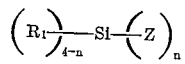

to produce a carboxy-silanol polymer;
and recovering said carboxy-silanol polymer;
said M being selected from the group consisting of hydroxy, alkali metaloxy, halo and hydrocarbyloxy substituents;
said R being an arylene substituent;
said $n$ being an integer indicative of the number of Z substituents in said aromatic silane and being at least 2 and no more than 3;
said Z being selected from the group consisting of hydroxy, halo, and hydrocarboyloxy substituents, M and Z being chosen so that a by-product is selected from the group consisting of carboxylic acid ester, carboxylic acid salt, carboxylic acid chloride, carboxylic acid, carboxylic acid anhydride, hydrohalogen acid, inorganic salt and water is produced; and said $R_1$ being an aryl substituent.

2. The carboxy-silanol polymer produced by the process of claim 1.

3. Process for producing a carboxy-silanol polymer comprising admixing, reacting and heating under reflux terephthalic acid and diacetoxydiphenylsilane and recovering a linear thermoplastic carboxy-silanol polymer.

4. Process for producing a carboxy-silanol polymer comprising admixing, reacting and warming in an inert atmosphere tetrachloroterephthaloyl chloride with diacetoxydiphenylsilane and recovering a linear thermoplastic carboxy-silanol polymer.

5. Process for producing a carboxy-silanol polymer comprising admixing and reacting terephthalic acid with an aromatic silane having the formula

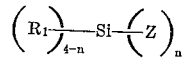

to produce a carboxy-silanol polymer;
and recovering said carboxy-silanol polymer;
said $n$ being an integer indicative of the number of Z substituents in said aromatic silane and being at least 2 and no more than 3;
said Z being selected from the group consisting of hydroxy, alkali metaloxy, halo, and hydrocarboyloxy substituents;
and said $R_1$ being an aryl substituent.

6. Process for producing a linear thermoplastic carboxy-silanol polymer comprising admixing and reacting terephthalic acid with diacetoxydiphenylsilane in a molar ratio of approximately 1:1, in an inert solvent, at a temperature of from about 50° C. to about 150° C., for a period of time sufficient to produce a linear thermoplastic carboxy-silanol polymer; isolating said polymer from said reaction mixture by distilling off the inert solvent and reaction by-product from said polymer.

References Cited
UNITED STATES PATENTS

| | | | |
|---|---|---|---|
| 2,584,342 | 2/1952 | Goodwin et al. | 260—46.5 |
| 2,584,343 | 2/1952 | Goodwin et al. | 260—46.5 |
| 2,584,344 | 2/1952 | Goodwin et al. | 260—46.5 |
| 2,910,496 | 10/1959 | Bailey et al. | 260—448.8 |
| 3,058,911 | 10/1962 | Matuszak et al. | 260—448.8 |
| 3,126,403 | 3/1964 | Matuszak et al. | 260—448.8 |
| 3,179,612 | 4/1965 | Plueddemann | 260—448 |
| 3,207,814 | 9/1965 | Goldberg | 260—46.5 |
| 3,250,802 | 5/1966 | Verdol | 260—78.4 |

FOREIGN PATENTS 528,135 7/1956 Canada.

DONALD E. CZAJA, *Primary Examiner.*

LEON J. BERCOVITZ, *Examiner.*

M. I. MARQUIS, *Assistant Examiner.*